United States Patent
Kacines

(10) Patent No.: US 8,904,700 B1
(45) Date of Patent: Dec. 9, 2014

(54) FISHING LURE WITH MAGNETICALLY RELEASABLE HOOK

(71) Applicant: Jeffery J. Kacines, Allen, TX (US)

(72) Inventor: Jeffery J. Kacines, Allen, TX (US)

( * ) Notice: Subject to any disclaimer, the term of this patent is extended or adjusted under 35 U.S.C. 154(b) by 254 days.

(21) Appl. No.: 13/664,598

(22) Filed: Oct. 31, 2012

Related U.S. Application Data

(60) Provisional application No. 61/628,708, filed on Nov. 4, 2011.

(51) Int. Cl.
*A01K 85/00* (2006.01)

(52) U.S. Cl.
USPC .............................. 43/42; 43/42.04; 43/42.35

(58) Field of Classification Search
USPC ............. 43/37, 42, 42.04, 42.1, 42.12, 42.35, 43/42.36, 42.37, 42.38, 42.41, 42.42, 43/42.43, 42.44
See application file for complete search history.

(56) References Cited

U.S. PATENT DOCUMENTS

| | | |
|---|---|---|
| 4,031,652 A | 6/1977 | Johnson |
| 5,090,151 A | 2/1992 | Salminen |
| 5,890,314 A | 4/1999 | Peters |
| 6,189,256 B1 * | 2/2001 | Boys ............................. 43/43.12 |
| 6,301,822 B1 * | 10/2001 | Zernov ......................... 43/42.31 |
| 6,304,512 B1 * | 10/2001 | Boys ................................. 367/2 |
| 6,305,120 B1 * | 10/2001 | Boys ............................. 43/43.12 |
| 6,502,345 B1 * | 1/2003 | Doyle ............................ 43/17.2 |
| 6,718,684 B2 | 4/2004 | Yong-Set |
| 6,782,654 B1 | 8/2004 | Borchardt |
| 7,669,360 B2 * | 3/2010 | Davidson .......................... 43/17 |
| 8,020,339 B1 | 9/2011 | Carter |
| 2006/0196105 A1 * | 9/2006 | Michlitsch ................... 43/44.83 |
| 2012/0137568 A1 | 6/2012 | Walsh et al. |
| 2013/0276350 A1 * | 10/2013 | Smith .......................... 43/42.38 |

* cited by examiner

*Primary Examiner* — Kimberly Berona
*Assistant Examiner* — Michael Wang
(74) *Attorney, Agent, or Firm* — Roger N. Chauza, PC

(57) ABSTRACT

A fishing lure having a material that is magnetically attracted to a magnet slid down a fishing line connected to the lure. A movable hook shaft housed within the lure is spring loaded to a position where a free end thereof is captured within the lure and a hook attached to the hook shaft cannot be removed from the free end. When the magnet is slid down the fishing line and magnetically influences the magnetic material, the hook shaft is moved to a position where the free end thereof is exposed and the hook can be removed therefrom.

20 Claims, 3 Drawing Sheets

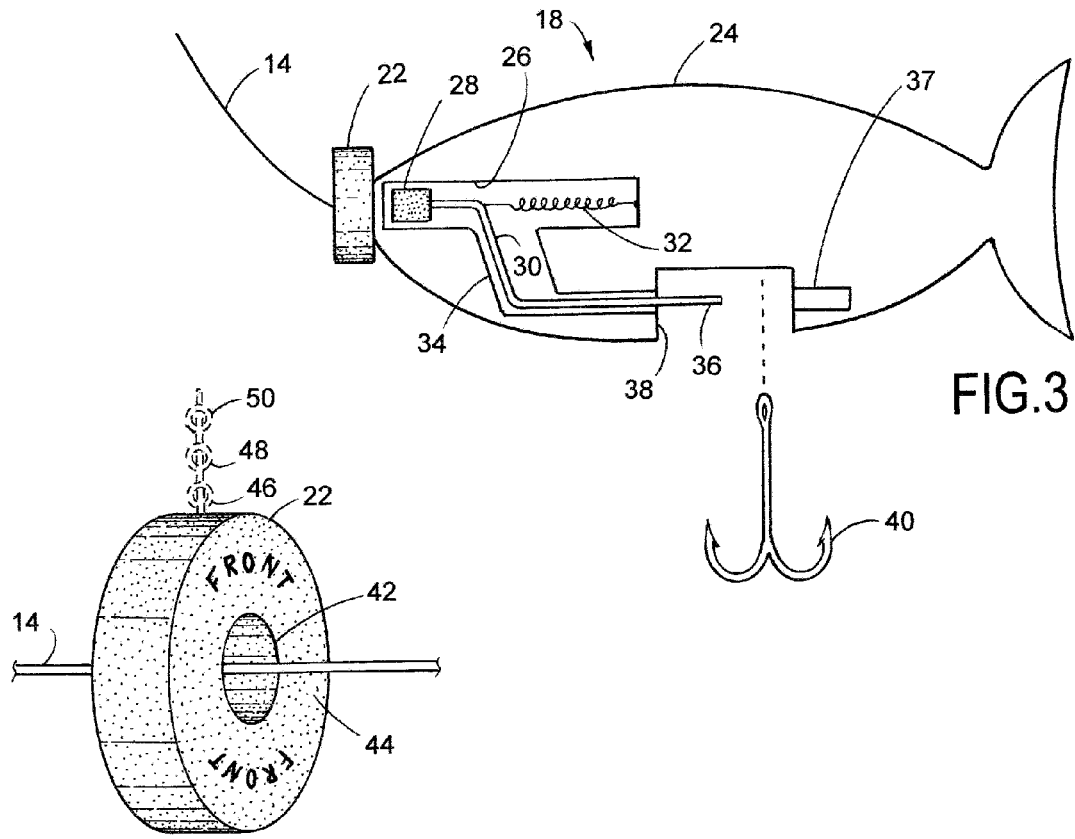
FIG.3
FIG.4
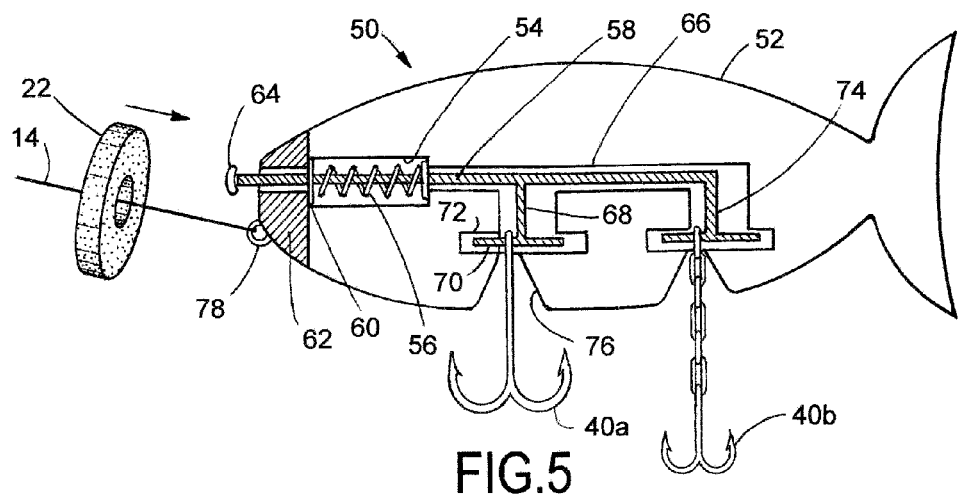
FIG.5

FISHING LURE WITH MAGNETICALLY RELEASABLE HOOK

RELATED APPLICATION

This non-provisional patent application claims the benefit of U.S. provisional application No. 61/628,708, filed Nov. 4, 2011.

TECHNICAL FIELD OF THE INVENTION

The present invention relates in general to fishing lures, and more particularly to the type of lures that incorporate mechanisms that release the hook therefrom when desired.

BACKGROUND OF THE INVENTION

Fishing is a highly popular pass time, hobby or even career. Some fish are caught by using a hook and live bait, including worms, small bait fish, etc. Lures are available to simulate the many characteristics of live fish to attract larger fish. A lure generally includes a body of some type that has the movement or coloring of bait fish. Attached to the lure is one or more hooks that are intended to catch the larger fish when the lure is ingested. There are a myriad of lures available for attracting certain types of fish. Thus, if a fisherman is interested in catching different types of fish, then a number of different lures are often used.

The marketing of lures is very competitive, in that some lures have a reputation for being successful in catching fish. To that end, many lures are moderately expensive and others are more expensive. Nonetheless, fishermen make every attempt to rescue a lure should it become hooked on an underwater obstruction during casting or fishing. If the hook of a lure becomes lodged in a log or branch under the water, it cannot often be dislodged by maneuvering the fishing line. Sometimes the only alternative is to pull on the line until it breaks, or cut the line, in which event the lure is lost and another one must be purchased.

In the event that the hook of a lure becomes hooked on an underwater obstruction, it is desirable that if anything is lost, it would be the hook and not the lure, as hooks are generally inexpensive and can thus be easily replaced. A lure with a releasable hook is more complex as the mechanism must distinguish between the maneuvering of the line to disengage the hook, as compared to the load placed on the lure when a fish is caught. In the former, the hook should be released from the lure when caught on an obstruction, but not released when hooked in a fish. The fishing line or lure mechanism cannot easily distinguish between the two events.

From the foregoing, it can be seen a need exists for a fishing lure having the capability to distinguish between being hooked on an obstruction, or hooked in a fish, in order to correctly release the hook when desired. Another need exists for a fishing lure that receives an input from the fisherman in order to release the hook from the lure. A further need exists for a fishing lure that responds to a magnetic field for releasing the hook, when the fisherman slides a magnet down the line into proximity with the lure, whereupon the hook is automatically released.

SUMMARY OF THE INVENTION

In accordance with the principles and concepts of the invention, disclosed is a fishing lure constructed with a hook that is releasable from the body of the lure, in response to a magnetic field. The magnet is donut-shaped and is slid down the fishing until it contacts the lure, whereupon a latch is released and the hook is disengaged from the lure.

According to another feature of the invention, the fishing lure is constructed with a spring-loaded shaft that has a metal or magnetic member attached thereto. The shaft can be moved against the spring force to a position to attach a hook thereto, and then released to allow the shaft to move to a closed position to capture the hook to the body of the lure. The lure can be used in the normal manner to attract fish and can withstand the load of a fish caught on the hook. In the event the hook is caught on a submersed object and cannot be dislodged, then the fisherman can slide the donut-shaped magnet down the fishing line and maneuver the line until the magnet is adjacent the lure. The magnetic field of the magnet is effective to move the metallic hook shaft against the spring bias so that the hook can be released from the lure. The lure can be retrieved by the fishing line and another hook attached thereto so that the lure can be reused.

According to an embodiment of the invention, disclosed is a fishing lure adapted for connection to a fishing line, where the fishing lure includes a body. The body houses a magnetic material that is magnetically attracted to a magnet slid down the fishing line. A movable hook shaft is housed by the fishing lure body, and the hook shaft is configured for attachment to a fishing hook. The hook shaft has a first position for capturing the hook thereon, and the hook shaft is movable from the first position to a second position in response to the proximity of the magnet to the magnetic material, wherein the movement of the hook shaft to the second position allows the hook to be released therefrom.

According to a further embodiment of the invention, disclosed is a fishing lure adapted for connection to a fishing line. The fishing lure includes a body having a cavity for holding a magnetically releasable hook mechanism. An access opening is formed in a bottom portion of the body of the lure. The access opening has opposing sidewalls, and the fishing lure body has aligned bores, where each bore is formed in a respective sidewall of the access opening. A magnet is adapted for sliding down the fishing line to the body of the lure. A magnetic material is carried by the fishing lure body. The magnetically releasable hook mechanism includes a hook shaft having one end movable within the cavity of the fishing lure body, and the hook shaft has a free end movable in the access opening of the body through the aligned bores. A spring biases the hook shaft to a position in which the free end of the hook shaft extends through the access opening. When the magnet is slid down the fishing line and is proximate the magnetic material, a magnetic attraction with the magnetic material causes the hook shaft to move so that the free end of the hook shaft is accessible in the access opening and the hook can be removed therefrom.

According to yet another embodiment, disclosed is a fishing lure adapted for connection to a fishing line. The fishing lure includes a body. A magnet is attachable to the fishing line for sliding down the fishing line from a fishing rod to the lure. A magnetic material is carried by the fishing lure body, and the magnetic material is of the type that is magnetically attracted to the magnet. A hook shaft is movable within the body of the fishing lure so that when the magnet and the magnetic material are attracted together, the hook shaft end is moved to become free and allow the hook to be removed therefrom.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 3 is a side view of the fishing lure of FIG. 2 during the operation in which the magnet proximate to the lure activates the mechanism to release the hook;

FIG. 4 is an isometric view of a magnet constructed according to the invention;

FIG. 5 is a side view of a fishing lure according to a second embodiment, showing the magnetically releasable hook mechanism;

DETAILED DESCRIPTION OF THE INVENTION

Figure 1:
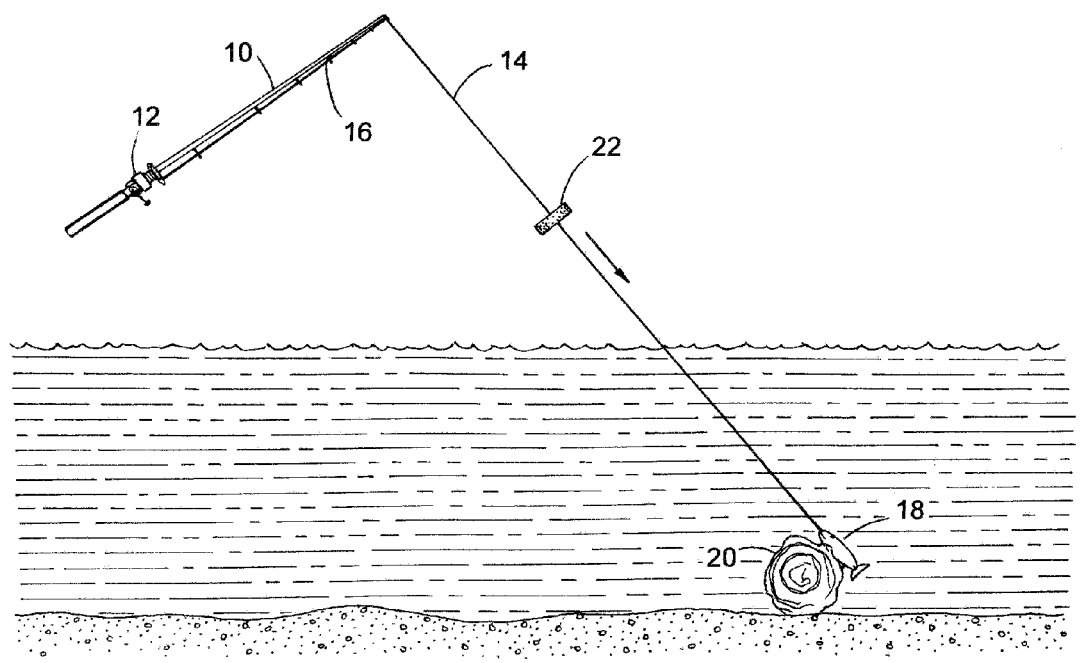
FIG. 1 is an illustration of a situation in which the fishing lure is lodged on an underwater obstruction, and a magnet slid down the fishing line to the lure can release the hook from the lure.

With reference to FIG. 1, there is shown a typical situation applicable to many fishermen. A person using a rod 10 and reel 12 can be fishing in a lake, pond, stream, or the like, with a lure 18 connected to a fishing line 14. The line 14 can be threaded through loops 16 of the rod 10. The principle and concepts of the invention can also be used with a cane or other type of fishing pole. On the bottom of many bodies of water are obstructions, such as logs one shown as numeral 20. Branches, stumps, rocks and other items can represent obstructions on which the hook of the lure 18 can be caught or lodged therein. As noted above, often the only alternative in such a situation is to cut the line 14 and lose the lure 18.

In accordance with the present invention, the lure 18 is constructed so as to be responsive to a magnetic field to release the hook attached thereto. To that end, a donut-shaped magnet 22 can be slid down the line 14 until it abuts against the lure 18, whereupon the magnetic field of the magnet 22 causes a mechanism in the lure 18 to become activated and release the hook therefrom. The hookless lure 18 can then be reeled in by the reel 12 and retrieved from the obstruction 20. Of course, the hook will remain lodged in the obstruction 20.

Figure 2:
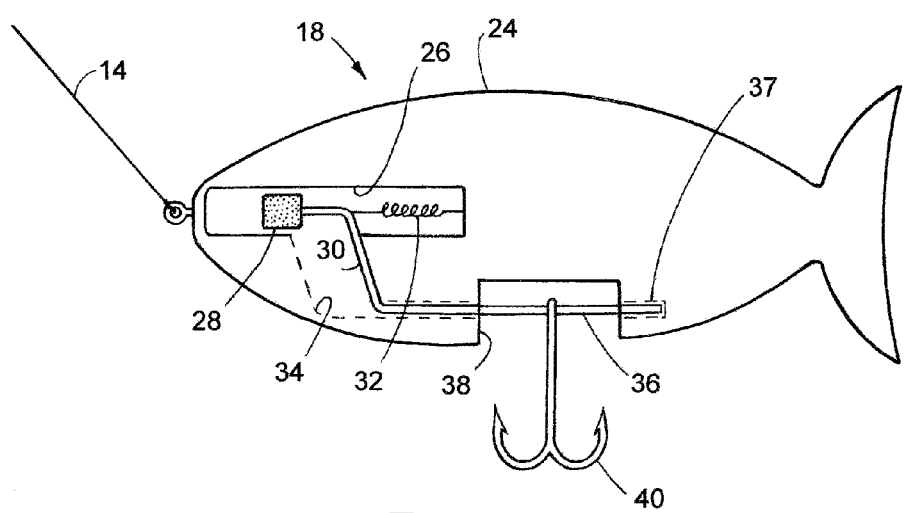
FIG. 2 is a side view of a fishing lure according to a first embodiment, showing the magnetically releasable hook mechanism.

Referring to FIG. 2, there is illustrated a fishing lure 18 constructed in accordance with an embodiment of the invention. The fishing lure 18 includes a body 24 that houses the magnetically activated hook release mechanism. The body 24 of the fishing lure 18 includes an internal cavity 26 that houses either a magnet 28 or a magnetic material such as iron, nickel, cobalt, alloys thereof, etc. Attached to the magnet 28 is a hook shaft 30 that is dog-leg shaped or otherwise angled. The hook shaft 30 can be straight or any other shape. The magnet 28 and the portion of the hook shaft 30 attached thereto is movable back and forth in the cavity 26, but is biased by a spring 32 to the back of the cavity 26. The spring 32 is connected at one end thereof to the hook shaft 30, and at the other end to the body 24 of the lure 18. The angled part of the shaft 30 extends through a chamber 34 and then a straight portion 36 of the hook shaft 30 extends in a bore 37 through an access opening 38 formed in the body 24 of the lure 18. As can be appreciated, the straight portion 36 of the hook shaft 30 is adapted for attachment to a hook 40. The eye of the hook 40 can be threaded on the straight portion 36 of the hook shaft 30 and thereby anchored to the lure 18. When employed in the conventional manner, the lure 18 can be cast at the end of the line 14 and reeled in to attract a fish so that it can be caught on the hook 40. When a fish is caught on the hook 40 any resistance it may give can be withstood by the straight part 36 of the hook shaft 30 captured in the lateral bore 37. The hook shaft 30 can be constructed of a stainless steel material that is fastened to the internal magnet 28. The hook shaft 30 can be formed with a hook (not shown) therein to hook one end of the spring 32 therein.

FIG. 3 illustrates the situation in which the hook 40 is released from the fishing lure 18. It can be appreciated that the hook 40 can be released when caught on an obstruction 20, or can be manually released to attach a different type of hook thereto. For example, the releasable mechanism can be manually activated by the fisherman holding a magnet adjacent the frontal end of the lure 18, whereupon the free end 36 of the hook shaft 30 will be retracted against the spring tension and allow the present hook to be removed and a different hook to be threaded onto the straight portion 36 of the hook shaft 30. A smaller hook or a larger hook can be attached to the lure 18 so that a certain size of fish can be caught. This feature is also advantageous as the hooks from all of the magnetically releasable lures can be removed and stored separately from the lures. This prevents the lures from becoming tangled when stored together with the hooks attached thereto.

The external magnet 22 is preferable donut-shaped so that the line 14 can be threaded threrethrough. The magnet 22 can initially have the line 14 threaded through the central hole 42 (FIG. 4) in the magnet 22, and the magnet 22 can then be maintained by a suitable fastener at the end of the rod 10 and ready to use. The magnet 22 can also be taped or otherwise fastened to the end of the rod 10 and around the fishing line 14 so as not to interfere with the line 14 as it is cast out or reeled in by the reel 12.

In any event, when it is desired to release the hook 40 from the lure 18, the magnet 22 slides down the fishing line 14 and is brought into proximity to the frontal end of the lure 18 to attract thereto the internal magnet 28 of the lure 18. The weight of the magnet 22 carries it along the taught fishing line 14 to the lure 18. When the external magnet 22 is in proximity with the frontal end of the lure 18, it is attracted to the internal lure magnet 28. If the hook release mechanism includes a metal disc instead of a magnet 28, then the external magnet 22 will nevertheless magnetically influence the metal disc to move it toward the external magnet 22. If the hook release mechanism includes a magnet 28, as shown, then it should be made certain that the magnetic poles of the external magnet 22 and the internal magnet 28 are opposite to provide a strong magnetic attraction rather than magnet opposition. To that end, the one face of the external magnet 22 can be marked or painted to make sure it is the end that faces forward when slid down the taught fishing line 14.

Referring again to FIG. 3, when the external magnet 22 is in close proximity to the internal magnet 28, the latter moves forwardly in the cavity 26, and carries with it in a forwardly direction the hook shaft 30. The force exerted between the opposite poles of the magnets 22 and 28 exceeds the bias of the spring 32, whereupon the internal magnet 28 moves forwardly against the spring force. When the internal magnet 28 moves forwardly the maximum extent, the end of the straight portion 36 of the hook shaft 30 is removed from the rear-most bore 37 to expose the end thereof. The hook 40 can be removed from the lure 18 from the free end 36 of the hook shaft 30. If the hook 40 is lodged in an underwater obstruction, the external magnet 22 will attract the internal magnet 28 and move the hook shaft 30 forwardly so that when the fisherman pulls on the line 14, the lure 18 will move with the line 14 but the hook 40 will slide off the end 36 of the hook shaft 30 and be released therefrom. The fishing lure 18 can be constructed so that the free end 36 of the hook shaft 30 recedes completely within the frontal bore so that the hook 40 is pushed off the end 36 by the sidewall of the access opening 38. The hook 40 can also be manually released from the lure 18 by the fisherman in a similar manner by simply holding a magnet 22 close to the frontal end of the lure 18. Alternatively, the fisherman can manually grasp the straight portion 36 of the hook shaft 30 and force it forwardly against the spring bias until the hook 40 can be removed from the hook shaft end 36.

The fishing lure 18 can be constructed using conventional techniques, including the molding of the lure in halves using a plastic or other suitable material. The components can be assembled in one half of the lure 18 and then the halves can be bonded together.

FIG. 4 illustrates an external magnet 22 constructed according to one embodiment of the invention. The magnet 22 is donut-shaped with a central hole 42 formed therein. The fishing line 14 is shown threaded through the central hole 42 in the magnet 22. The magnet 22 can be constructed of many different types of magnetic materials, including iron magnets, ceramic magnets, rare earth neodymium magnets, etc. The magnet 22 can be coated with a protective plastic or rubber material so that it does not deteriorate from the effects of water. The frontal face 44 of the magnet 22 is marked with the words "FRONT" molded or painted thereon. Optionally, the magnet 22 can be formed with an eye 46 attached thereto. The eye 46 can be fastened to a few links of a chain 48, with a spring-loaded clasp 50 connected to the loose end of the chain 48. With this arrangement, and as described in connection with FIG. 7 below, the clasp 50 can be opened and placed around the fishing line 14 so that the magnet 22 is carried down the taught line 14 to the frontal end of the lure 18.

Figure 6:
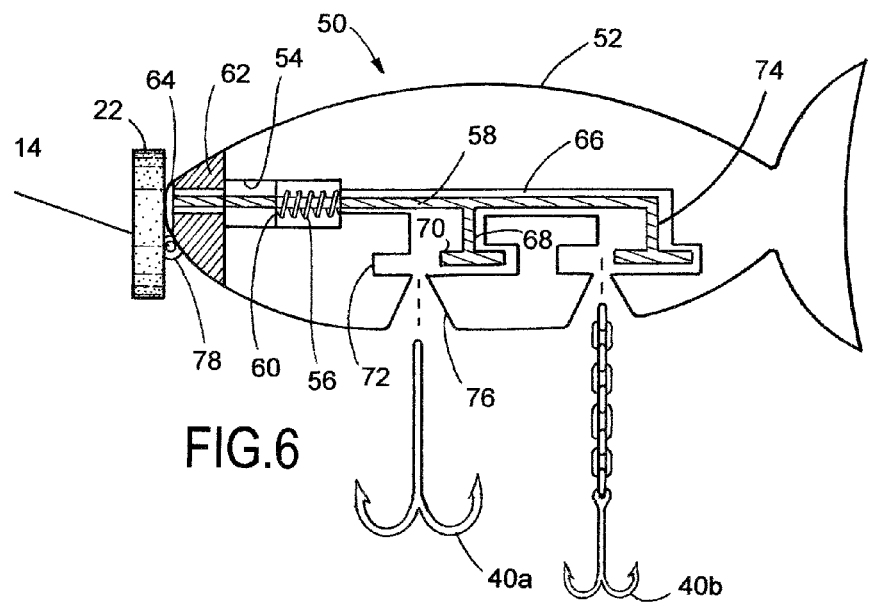
FIG. 6 is a side view of the fishing lure of FIG. 5 during the operation in which the magnet proximate to the lure activates the mechanism to release the hook.

FIGS. 5 and 6 illustrate another embodiment of a fishing lure 50 with magnetically releasable hooks 40a and 40b. The fishing lure 50 includes a body 52 constructed of a moldable plastic material. The body 52 of the fishing lure 50 includes a cavity 54 that houses a spring 56 that encircles a hook shaft 58. One end of the spring 56 abuts against a washer 60 that is attached to the hook shaft 58. The other end of the spring 56 abuts against one end of the cavity 54. The left end of the hook shaft 58, as seen in FIG. 5, extends through a bore in a magnetic metal 62, such as iron, and extends out of the frontal end of the fishing lure 50. A button stop 64 can be fastened to the frontal end of the hook shaft 58. The hook shaft 56 extends from the cavity 54 inside a channel 66 formed in the body 52 of the lure 50.

The hook shaft 56 is formed with two downwardly depending legs 68 and 74. The leg 68 includes a lateral part 70 for insertion into the eye of the hook 40a. Formed in the bottom of the body 52 of the fishing lure 50 is an access opening 76 to allow external access to the lateral part 70 of the hook shaft leg 68. As can be appreciated, when the button stop 64 is pushed to the right, the hook shaft 58 is also moved to the right. As a result, the washer 60 moves to the right and the spring 56 is compressed so that the lateral part 70 of the leg 68 moves out of the bore 72. The eye of the hook 40a can then be manually attached to the lateral part 70 of the hook shaft leg 68. Once the button stop 64 is released, the compressed spring forces the lateral part 70 to move to the left back into the bore 72 to thereby capture the hook 40a on the lateral part 70. The other hook 40b can be captured on the other hook shaft leg 74 in a similar manner. Again, the hook shaft 58 can be constructed of a stainless steel metal of suitable strength to accommodate the force or weight of a fish of a desired size. The hooks 40a and 40b can be easily attached or removed from the respective hook shaft legs 68 and 74 by simply pushing in on the button stop 64 which exposes the ends of the lateral parts of the legs 68 and 74. The hooks 40a and 40b can be replaced with different hooks, or the hooks can be stored separately from the lure 50 so that tangling with other lures is eliminated.

The frontal end of the fishing lure 50 includes a eyelet 78 for attachment thereto of the fishing line 14. As with the fishing lure 18 described above, the fishing lure 50 is activated by the magnetic field of a magnet 22 slid down the line 14. The metal 62 can be bonded to the frontal nose of the fishing lure body 52. In the event that the magnetic part 62 is a magnet, then the poles of the external magnet 22 and the internal magnet 62 must be the opposite so that a strong attraction force is achieved.

FIG. 6 illustrates the function of the fishing lure 50 when it is desired to magnetically release the hooks 40a and 40b from attachment to the lure 50. In the event that one or both of the hooks 40a and 40b become lodged in an obstruction and cannot be dislodged by maneuvering of the fishing line 14, then it may be decided to release the hooks 40a and 40b to retrieve the lure 50. The release of the hooks 40a and 40b is achieved by sliding the magnet 22 down the fishing line 14. When the line 14 is held taught, the magnet 22 will eventually come into proximity to the frontal end of the lure 50, and be attracted to the magnetic metal 62 located in the nose of the lure 50. The magnetic attraction between the magnet 22 and the magnetic metal 62 causes the two magnetic elements to come together, whereupon the frontal button stop 64 is pushed inside the lure 50 by the external magnet 22. As described above, when the button stop 64 is pushed in, the spring 56 compresses as the hook shaft 58 moves to a position to allow the lateral parts 70 of the respective hook shaft legs 68 and 74 to move out of the respective bores 72. This effectively pushes the hooks 40a and 40b off the ends of the respective lateral parts 70 and be released from attachment to the fishing lure 50. The fishing lure 50 can then be freed from the underwater obstruction and retrieved by the line 14 to be used again with a different set of hooks.

One advantage of the fishing lures of the invention is that the spring 56 does not have to withstand the load of a fish caught on either hook 40a or 40b. The spring 56 need only be weak enough to be overcome by the force of the magnet 22, and strong enough to bring the lateral parts 70 of the hook shaft 58 back into the respective bores 72. The load of a fish caught on the hook 40a is sustained by the strength of the lateral part 70 of the hook shaft leg 68 and the underlying portion of the body 52 of the lure 50. The pulling of the fish on the hook 40a will not move the lateral part 70 forwardly, as the washer 60 is abutted against the magnetic metal part 62. If the pull on the hook 40a is backwards, the hook shaft 58 could move back somewhat, but this movement is not in a direction to allow the hook 40a to be removed from the lateral part 70.

Figure 7:
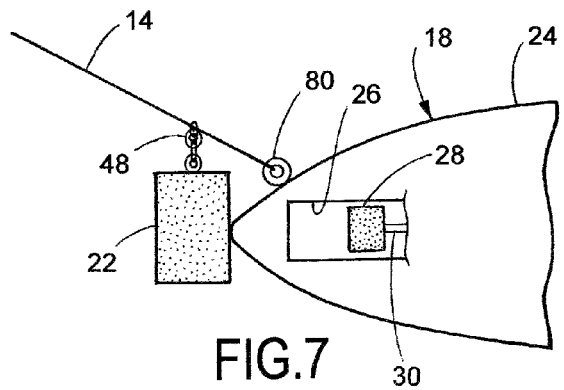
FIG. 7 illustrates a magnet connected to the fishing line by a chain to rotate and self align the magnetic pole with the internal magnet of the lure.

FIG. 7 illustrates another embodiment of the magnet 22 adapted to activate the magnet 28 in the fishing lure 18. Here, the magnet 22 is suspended from the fishing line 14 by a short length of a chain 48. As described above in connection with FIG. 4, the chain 48 is easily connected to the line 14 by a clasp 50 that can be opened and closed by the fisherman. In any event, the magnet 22 is slid down the fishing line 14 as suspended by the chain 48. In this embodiment, the eyelet 80 to which the fishing line 14 is connected is attached to the upper part of the nose of the lure 18 so that the magnet 22 suspended from the line 14 can come into contact with the frontal portion of the lure 18. This is particularly useful when the magnetic part in the lure 18 is also a magnet. In such event, the external magnet 22 can rotate on the chain 48 so that it will automatically orient the opposite pole thereof with respect to the internal magnet 28. A swivel can also be used to attach the external magnet 22 to the line 14 to allow swiveling movement of the magnet 22 to self align with the opposite pole of the internal magnet 28. With this arrangement, the orientation of the external magnet 22 when slid down the fishing line 14 is inconsequential, as it will automatically rotate to align in an attraction mode with the internal magnet 28.

Figure 8:
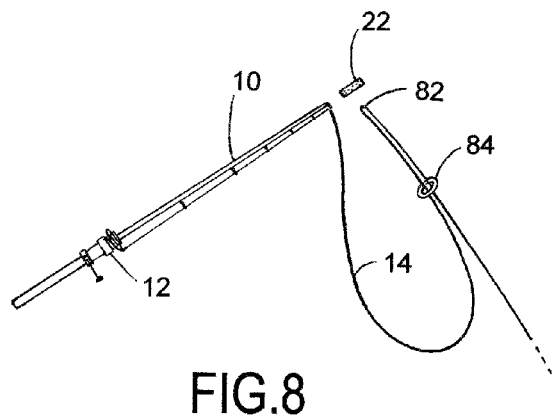
FIG. 8 illustrates another technique for sliding the magnet down the fishing line.

FIG. 8 illustrates a technique in which the external magnet 22 can be slid down the fishing line 14 without initially threading the magnet 22 on the line 14. In other words, according to this technique, the magnet 22 can be carried on the fisherman, or stored in the tackle box until needed to release the hook 40 from the lure 18. When it is determined that the fishing lure 18 cannot be dislodged from the underwater obstruction by maneuvering the fishing line 14, then the fisherman can pull extra line 14 out of the reel 12 and loop it to an end 82. The looped end 82 of the fishing line 14 is then inserted through the central hole 42 of the magnet 22 and the magnet 22 is allowed to slide down the double line 84. A sufficient amount of line 14 is pulled out of the reel 12 so that the double line 84 reaches the fishing lure 18. The weight of the magnet 22 will allow it to slide down the double line 84 until it reaches the hung lure 18 and activate the magnetic mechanism within the lure 18 to release the hook 40 therefrom, as described in the embodiment illustrated above.

Illustrated and described above are various embodiments of fishing lures with magnetically releasable hooks. An external magnet slid down the fishing line comes into proximity to the lure so as to move a magnetically attractable member within the lure and move a hook engaging member to thereby allow the hook to be released from the lure. The fishing lure can be retrieved to be used again with another hook. In addition, the magnetically activated mechanism in the lure can be manually activated by the fisherman to cause release of the hook and another hook to be used. The ability of the fisherman to manually activate the hook release mechanism is advantageous so that the lure can be stored in the tackle box without hooks attached thereto to prevent tangling of the hooks of multiple lures stored together.

While the preferred and other embodiments of the invention have been disclosed with reference to specific magnetically releasable fishing hook mechanisms, and associated methods thereof, it is to be understood that many changes in detail may be made as a matter of engineering choices without departing from the spirit and scope of the invention, as defined by the appended claims.

What is claimed is:

1. A fishing lure adapted for connection to a fishing line, said fishing lure comprising:
   a body of the fishing lure;
   said body housing a magnetic material that is magnetically attracted to a magnet slid down the fishing line;
   a movable hook shaft housed by said fishing lure body, said hook shaft configured for attachment to a fishing hook, and said hook shaft having a first position for capturing the hook thereon; and
   said hook shaft movable from said first position to a second position in response to the proximity of the magnet to said magnetic material, wherein the movement of said hook shaft to said second position allows the hook to be released therefrom.

2. The fishing lure of claim 1, wherein said magnetic material comprises a magnet.

3. The fishing lure of claim 1, wherein said magnetic material comprises a material of iron, nickel or cobalt.

4. The fishing lure of claim 1, further including a spring for biasing the hook shaft to said first position.

5. The fishing lure of claim 4, wherein one end of said spring engages the body of said lure, and a different end of said spring engages said hook shaft.

6. The fishing lure of claim 1, further including in combination said magnet.

7. The fishing lure of claim 6, wherein said magnet includes a chain attached thereto, and said chain is attachable to the fishing line to be slid thereon.

8. The fishing lure of claim 1, wherein the body of said fishing lure includes a bottom opening therein for exposing a portion of said hook shaft when in said first position.

9. The fishing lure of claim 8, wherein said hook shaft includes an end that is exposed in said opening when in said second position.

10. The fishing lure of claim 1, wherein said magnetic material is attached to said hook shaft so that when the magnet is attracted to said magnetic material, the magnetic material moves toward said magnet and moves the hook shaft accordingly.

11. The fishing lure of claim 1, wherein said magnetic material is attached to a frontal part of said lure, and an end of said hook shaft protrudes from the frontal end of said fishing lure, whereby when the magnet is attracted to said magnetic material the magnet pushes the end of said hook shaft to said second position.

12. A fishing lure adapted for connection to a fishing line, said fishing lure comprising:
   a body of said fishing lure, said body having a cavity for holding a magnetically releasable hook mechanism;
   an access opening formed in a bottom portion of the body of said lure, said access opening having opposing sidewalls, and said body having aligned bores, each bore formed in a respective said sidewall of said access opening;
   a magnet adapted for being slid down the fishing line to the body of said lure;
   a magnetic material carried by said fishing lure body;
   said magnetically releasable hook mechanism including;
   a hook shaft having one end movable within the cavity of said body, and said hook shaft having a free end movable in the access opening of said body through said aligned bores;
   a spring biasing said hook shaft to a position in which the free end of said hook shaft extends through said access opening in said aligned bores; and
   when said magnet is slid down the fishing line and is proximate said magnetic material, a a magnetic attraction with said magnetic material causes said hook shaft to move so that the free end of said hook shaft is accessible in said access opening and the hook can be removed therefrom.

13. The fishing lure of claim 12, wherein said magnetic material is movable within the cavity of said fishing lure body.

14. The fishing lure of claim 12, wherein said magnetic material is fixed to said fishing lure body and not movable with respect to said fishing lure body.

15. The fishing lure of claim 12, wherein said spring is compressed when said hook is released.

16. The fishing lure of claim 12, wherein said spring is stretched when said hook is released.

17. The fishing lure of claim 12, wherein said magnet includes a hole therein for sliding down the fishing line from a fishing rod to the lure where the hook is caught on an underwater obstruction.

18. A fishing lure adapted for connection to a fishing line, said fishing lure comprising:
- a fishing lure body for attaching to the fishing line;
- a magnet attachable to the fishing line for sliding down the fishing line from a fishing rod to the lure;
- a magnetic material carried by the fishing lure body, said magnetic material of the type that is magnetically attracted to the magnet; and
- a hook shaft movable within the body of said fishing lure so that when said magnet and said magnetic material are attracted together, the hook shaft end is moved to become free and allow a fishing hook to be removed therefrom.

19. The fishing lure of claim 18, wherein said magnet is formed with a hole therein for threading therethrough the fishing line.

20. The fishing lure of claim 18, wherein said magnetic material comprises a magnet.

\* \* \* \* \*